W. L. WATSON.
DEFLATING TOOL.
APPLICATION FILED JAN. 23, 1914.

1,104,028.

Patented July 21, 1914.

WITNESSES
M. R. McL—
E. A. Paul

INVENTOR
WILLIAM L. WATSON
BY
Paul & Paul
ATTORNEYS

UNITED STATES PATENT OFFICE.

WILLIAM L. WATSON, OF McKENZIE, NORTH DAKOTA.

DEFLATING-TOOL.

1,104,028.

Specification of Letters Patent.

Patented July 21, 1914.

Application filed January 23, 1914. Serial No. 813,886.

*To all whom it may concern:*

Be it known that I, WILLIAM L. WATSON, citizen of the United States, resident of McKenzie, county of Burleigh, State of North Dakota, have invented certain new and useful Improvements in Deflating-Tools, of which the following is a specification.

In the operation of an automobile, it is frequently necessary to remove the inner tube of a tire because of a puncture or blowout and substitute another tube in place thereof, the tube that is removed being rolled up and packed away in the car. To roll the tube into compact form it is necessary, of course, to exhaust the air and to do this the air valve must be held open while the tube is being rolled. It is extremely inconvenient for the person rolling the tube to hold this valve open to allow the escape of the air and the object of my present invention is to provide a device capable of quick attachment to the stud in which the valve is mounted for holding the valve in its open position while the air is being forced out of the tube.

A further object is to provide a device which can be carried in the pocket or on a key-ring, if desired, and always be ready for immediate use.

A further object is to provide a deflating device of simple, economical construction and capable of use with varying sizes of tire studs.

The invention consists generally in various constructions and combinations, all as hereinafter described and particularly pointed out in the claims.

Figure 1:
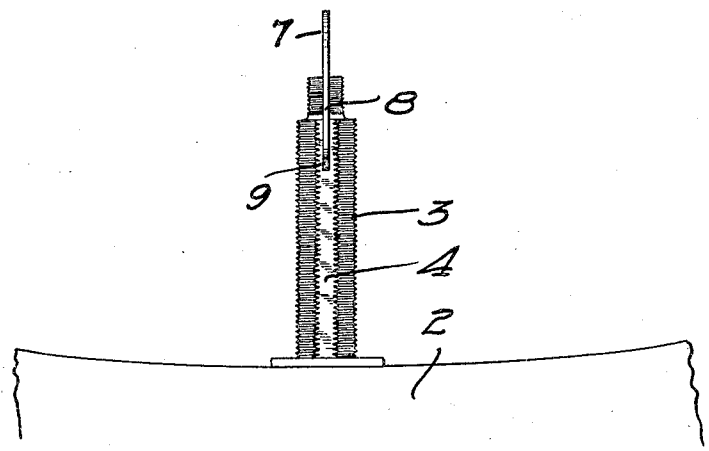
Figure 3:
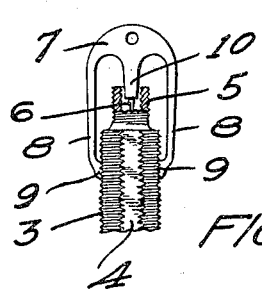
Figure 2:
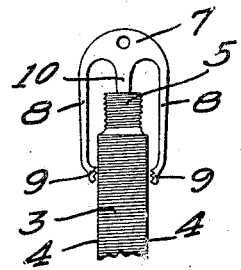
Figure 4:
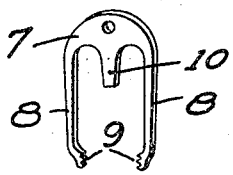

In the accompanying drawings forming part of this specification, Figure 1 is a plan view of a portion of a tire tube, showing the stem wherein the valve is supported with my invention applied thereto, Fig. 2 is a detail view, illustrating the manner of applying the deflating tool to the stud, Fig. 3 is a similar view, showing the deflating tool mounted on the stem and holding the valve in its open position, Fig. 4 is a perspective view of the deflating tool.

In the drawing, 2 represents a portion of an inner tube, having a threaded stem 3 provided with the usual flat surfaces 4 for the application of a wrench or other tool thereto, this construction being common to all tire tubes. The stem 3 is hollow and terminates in an exteriorly threaded extension 5, into which the stem 6 of the valve projects, this extension and the stem of the valve being normally concealed by a suitable cap fitting thereon.

7 represents a deflating tool, stamped preferably from a suitable spring material and having arms 8 which are adapted to straddle the stem 3 and are provided with corrugated end faces 9 that are adapted to engage the threads of the outer surfaces of the stem 3. These arms are sufficiently flexible to allow the tool to be mounted on stems of varying diameters and thus the tool is adapted for tires having different sizes of stems. Between the arms 8 I provide a lug 10 that is adapted to enter the opening in the end of the stem and engage the valve stem 6 and hold it in its open position, when the ends of the spring arms 8 are in engagement with the threads of the stem 3.

In applying the device to a tire stud, the arms are slipped over the end of the stud until the lug 10 contacts with the stem and opens the valve. The tool is then rotated until the corrugated faces 9 engage the threads of the stud, whereupon the device will be locked and the valve will be held in its open position and the air may be forced from the tube as it is rolled up. As soon as the tube is deflated, the operator will rotate the deflating device until the arms 8 are disengaged from the threads, when the tool may be removed from the stud.

The device may be made of metal, fiber, or any other suitable material having sufficient spring or resiliency to cause the arms to grip the threads of the stud sufficiently to hold the device in place thereon.

I do not wish to be confined to the shape of this tool, as it may be modified in various ways and the details of construction may also be changed and still be within the scope of my invention, the essential feature being the arms.

I claim as my invention:

1. A deflating tool having arms adapted to straddle a tire valve stem and slide on the flattened surfaces thereof, said arms having means to engage the threads of said stem when the tool is rotated, said tool having means between said arms to engage the valve within said stem and hold it in an open position while said arms are in engagement with said threads.

2. A deflating tool comprising a head having a lug formed thereon and spring arms in substantially parallel relation adapted to straddle the tire valve stem and slide on the flattened surfaces of said stem, said arms engaging the threads of said stem when the tool is rotated and capable of springing apart to adapt the tool for stems of different size, said lug entering the opening in said stem and engaging the valve therein to hold it in an open position.

In witness whereof, I have hereunto set my hand this 17 day of January, 1914.

WILLIAM L. WATSON.

Witnesses:
BENJ. F. SCOVIL.
P. P. BLISS.

Copies of this patent may be obtained for five cents each, by addressing the "Commissioner of Patents, Washington, D. C."